US006288836B1

(12) United States Patent
Kawasaki et al.

(10) Patent No.: US 6,288,836 B1
(45) Date of Patent: Sep. 11, 2001

(54) OPTICAL AMPLIFIER AND OPTICAL COMMUNICATION SYSTEM HAVING THE OPTICAL AMPLIFIER

(75) Inventors: Yumiko Kawasaki, Kawasaki; Satoru Okano, Sapporo; Kazuo Yamane, Kawasaki; Hiroshi Nishimoto, Kawasaki; Takashi Tsuda, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/040,323

(22) Filed: Mar. 18, 1998

(30) Foreign Application Priority Data

Oct. 17, 1997 (JP) .................................................. 9-285583

(51) Int. Cl.[7] ............................... G01J 3/28; H04B 10/08
(52) U.S. Cl. .................... 359/341.42; 359/134; 359/160; 359/341.3
(58) Field of Search .................................. 359/134, 160, 359/174, 177, 337, 341

(56) References Cited

U.S. PATENT DOCUMENTS

| 5,664,131 | * | 9/1997 | Sugiya ................................. 359/341 |
| 5,703,711 | * | 12/1997 | Hamada ............................... 359/341 |
| 5,818,629 | * | 10/1998 | Kinoshita ............................. 359/341 |
| 6,025,947 | * | 2/2000 | Sugaya et al. ....................... 359/160 |

FOREIGN PATENT DOCUMENTS

| 782289 | * | 7/1997 | (EP) . |
| 2294170 | * | 4/1996 | (GB) . |
| 8-264871 | * | 10/1996 | (JP) . |

OTHER PUBLICATIONS

Kinoshita et al, OSA Trends in Optics and Phatonics, vol. 5, pp. 49–52, Jul. 13, 1996.*
Desurvire, E; Physics Today, pp. 20–27, Jan. 1994.*

* cited by examiner

Primary Examiner—Nelson Moskowitz
(74) Attorney, Agent, or Firm—Staas & Halsey LLP

(57) ABSTRACT

The present invention relates to an optical amplifier and an optical communication system applied to WDM (wavelength division multiplexing). The optical amplifier includes an optical amplifying medium to which WDM signal light obtained by wavelength division multiplexing a plurality of optical signals having different wavelengths is supplied, a pumping unit for pumping the optical amplifying medium such that the medium gives a gain to the WDM signal light, a feedback loop for controlling the pumping unit so that the gain is maintained constant, and an optical attenuator for giving a variable attenuation to the WDM signal light. Through the structure of the present invention, it becomes possible to provide an optical amplifier which can maintain constant the optical output level per channel of WDM and can maintain the gain characteristic constant.

18 Claims, 14 Drawing Sheets

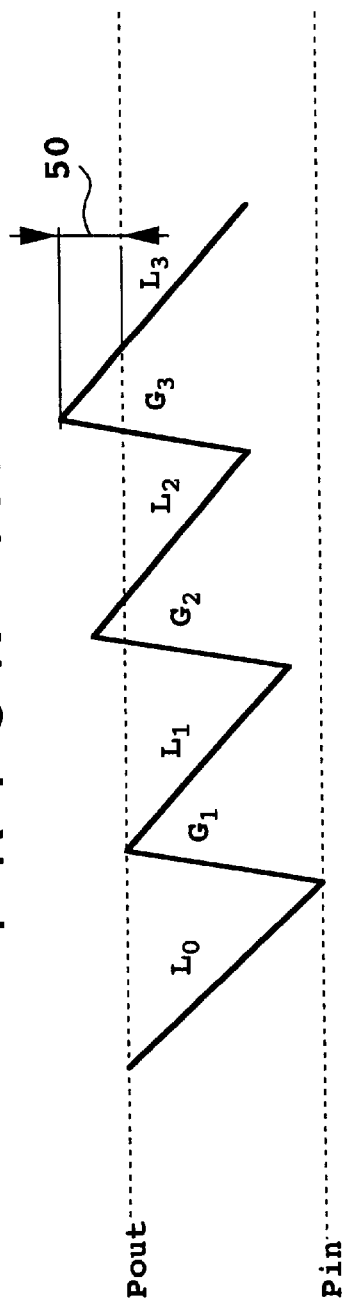
FIG. 8A
PRIOR ART
FIG. 8B
PRIOR ART

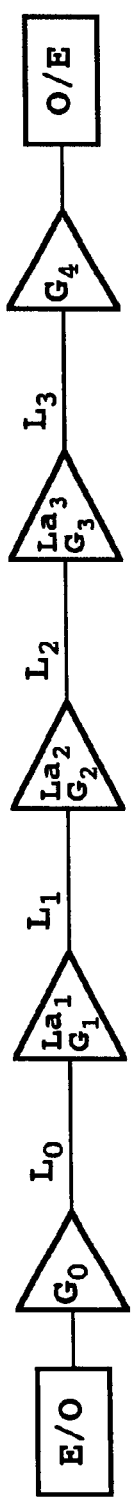
F I G. 9A
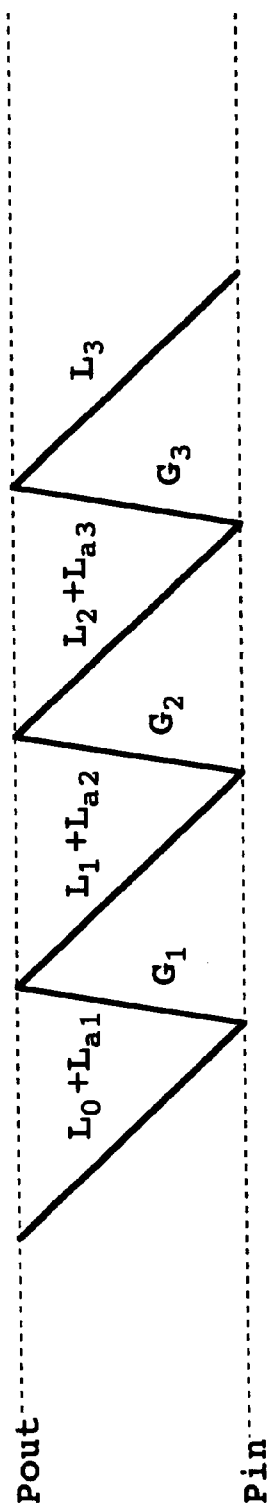
F I G. 9B

F I G. 1 2
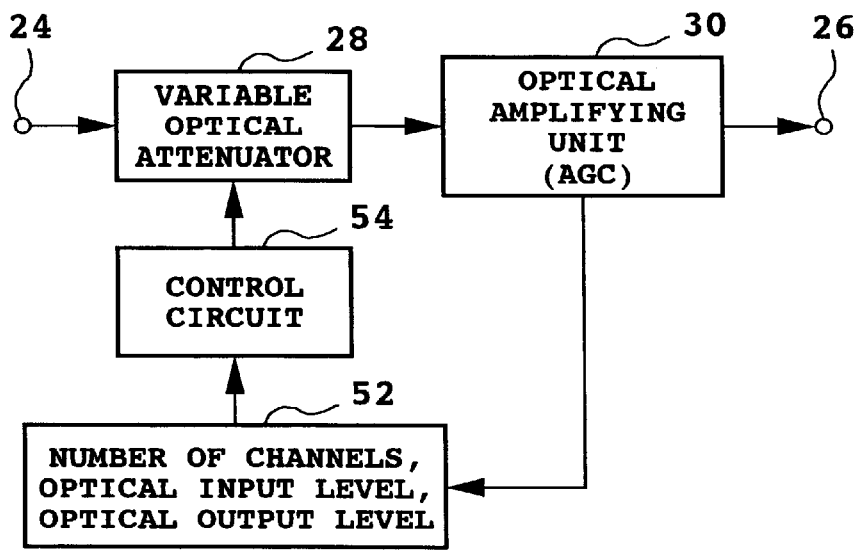
F I G. 1 3
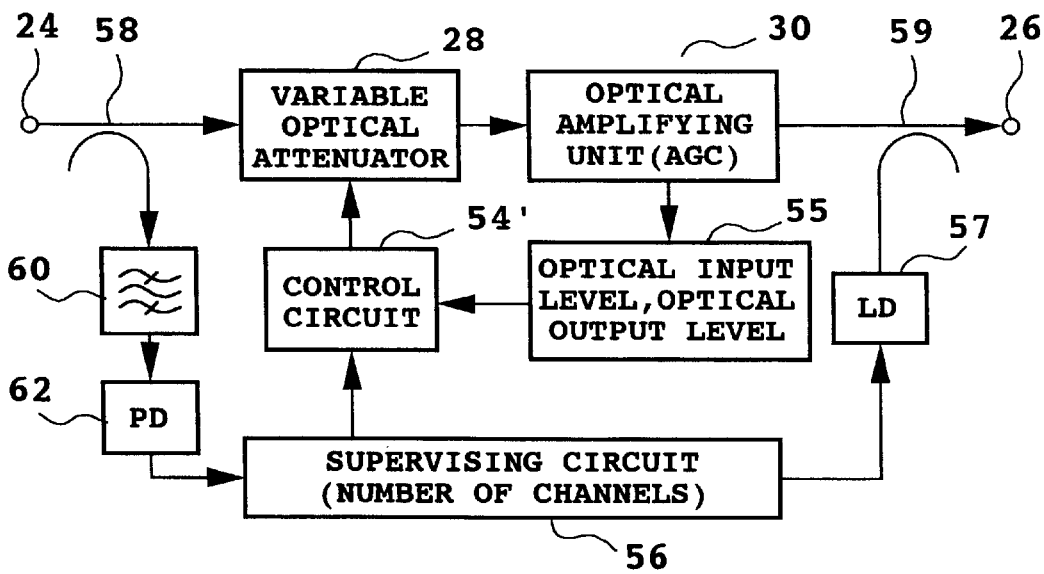

OPTICAL AMPLIFIER AND OPTICAL COMMUNICATION SYSTEM HAVING THE OPTICAL AMPLIFIER

BACKGROUND OF THE INVENTION

1. Field of the Invention

The present invention relates generally to wavelength division multiplexing (WDM) using a plurality of optical signals having different wavelengths, and more particularly to an optical amplifier applied to WDM and an optical communication system including the optical amplifier.

2. Description of the Related Art

In recent years, a manufacturing technique and using technique for a low-loss (e.g., 0.2 dB/km) optical fiber have been established, and an optical transmission system using the optical fiber as a transmission line has been put to practical use. Further, to compensate for losses in the optical fiber and thereby allow long-haul transmission, an optical amplifier for amplifying signal light has been put to practical use.

An optical amplifier known in the art includes an optical amplifying medium to which signal light to be amplified is supplied and means for pumping (exciting) the optical amplifying medium so that the optical amplifying medium provides a gain band including the wavelength of the signal light. For example, an erbium doped fiber amplifier (EDFA) includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

Accordingly, by combining an optical amplifier and WDM, the span and capacity of an optical transmission system can be increased.

In the case of incorporating an optical amplifier into a system adopting WDM, a transmission distance is limited by a gain characteristic (wavelength dependence of gain) which is represented by a gain deviation or gain tilt. For example, in an EDFA, a gain deviation is produced at wavelengths in the vicinity of 1.55 $\mu$m. When a plurality of EDFAs are cascaded to cause accumulation of gain deviations, an optical SNR (signal-to-noise ratio) in a channel included in a band giving a small gain is degraded.

Automatic gain control (AGC) is effective in maintaining the gain characteristic of an optical amplifier constant. In an EDFA, for example, an optical input level and an optical output level are monitored, and the power of pump light is controlled so that the ratio or difference between the optical input level and the optical output level is maintained constant. By presetting a target value of the pump light power to a suitable value, a flat gain characteristic is maintained.

However, in the case of performing AGC only, the optical output level in each channel of the WDM signal light is not always maintained constant. For example, if the optical output level in a certain channel exceeds a tolerable range, transmission characteristics in this channel are degraded by the influence of nonlinear effects occurring in an optical fiber transmission line. The influence of nonlinear effects is remarkable especially in the case of high-speed transmission at rates over 10 Gb/s.

SUMMARY OF THE INVENTION

It is therefore an object of the present invention to provide an optical amplifier which can maintain constant the optical output level in each channel of WDM signal light and can maintain the gain characteristic constant.

It is another object of the present invention to provide a novel optical communication system including such an optical amplifier.

Other objects of the present invention will become apparent from the following description.

According to one aspect of the present invention, there is provided an optical amplifier comprising an optical amplifying medium to which WDM (wavelength division multiplexed) signal light obtained by wavelength division multiplexing a plurality of optical signals having different wavelengths is supplied; means for pumping the optical amplifying medium so that the optical amplifying medium gives a gain to the WDM signal light; means for controlling the pumping means according to an input level and an output level of the optical amplifying medium so that the gain is maintained constant; and an optical attenuator operatively connected to the optical amplifying medium for giving a variable attenuation to the WDM signal light.

With this configuration, gain control is performed according to the input level and the output level of the optical amplifying medium so that the gain is maintained constant, thereby maintaining the gain characteristic constant. Further, since the optical attenuator for giving a variable attenuation to the WDM signal light is adopted, the optical output level in each channel of the WDM signal light can be maintained by manual or automatic adjustment of the attenuation of the optical attenuator.

In accordance with another aspect of the present invention, there is provided an optical communication system comprising an optical fiber transmission line for propagating WDM signal light, and at least one optical amplifier provided in the optical fiber transmission line. This optical amplifier has the configuration of the optical amplifier according to the present invention.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 8A and 8B are diagrams for illustrating the accumulation of errors in output level in the case of performing AGC only in a prior art in-line amplifier system;

FIGS. 9A and 9B are diagrams for illustrating an effect of the optical amplifier according to the present invention;

FIG. 12 is a block diagram showing a fourth preferred embodiment of the optical amplifier according to the present invention;

FIG. 13 is a block diagram showing a fifth preferred embodiment of the optical amplifier according to the present invention;

DETAILED DESCRIPTION OF THE PREFERRED EMBODIMENTS

Some preferred embodiments of the present invention will now be described in detail with reference to the attached drawings.

Figure 1:
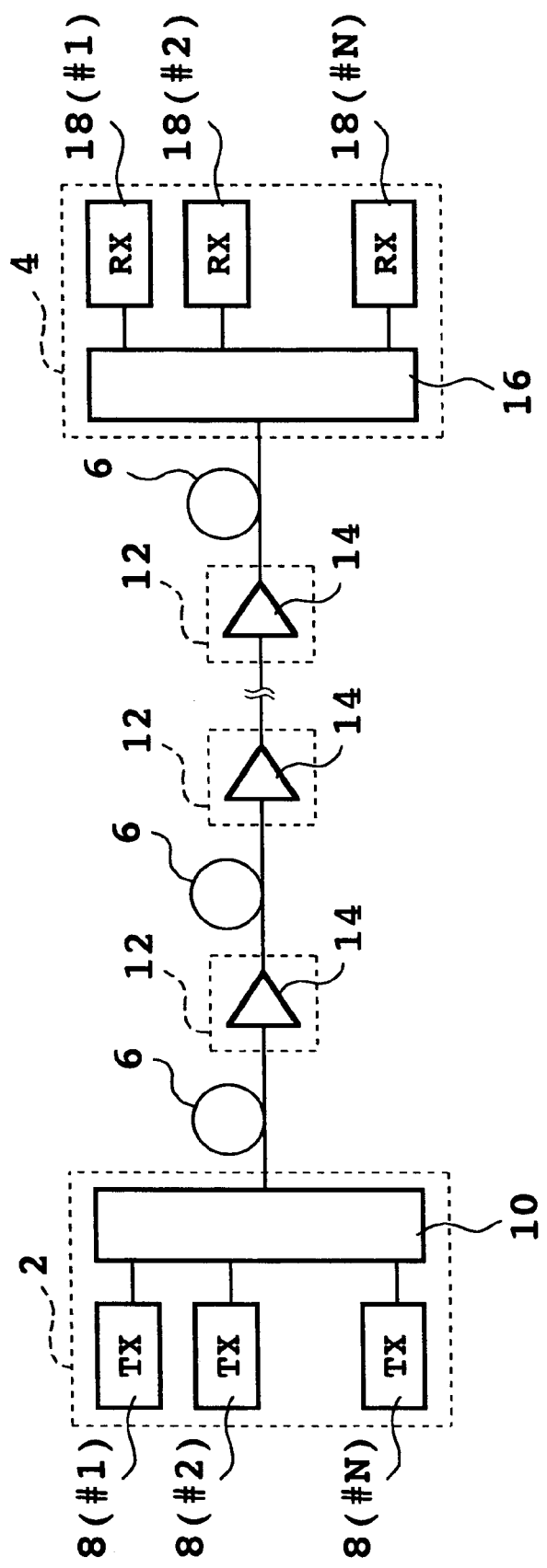
FIG. 1 is a block diagram showing a preferred embodiment of the optical communication system according to the present invention.

FIG. 1 is a block diagram showing a preferred embodiment of the optical communication system according to the present invention. This system includes a first terminal station (apparatus) 2 for transmission, a second terminal station (apparatus) 4 for reception, and an optical fiber transmission line 6 for connecting the terminals 2 and 4. The first terminal station 2 includes a plurality of optical transmitters (TX) 8 (#1 to #N) for outputting a plurality of optical signals having different wavelengths, and an optical multiplexer 10 for wavelength division multiplexing these optical signals to obtain WDM signal light. The WDM signal light is supplied to the optical fiber transmission line 6. A plurality of optical repeaters 12 are provided in the optical fiber transmission line 6. Each optical repeater 12 includes an in-line optical amplifier 14 for amplifying the WDM signal light. The second terminal station 4 includes an optical demultiplexer 16 for separating the WDM signal light supplied from the optical fiber transmission line 6 according to wavelengths to obtain a plurality of optical signals in individual channels, and a plurality of optical receivers (RX) 18 (#1 to #N) for receiving these optical signals, respectively.

With this configuration shown in FIG. 1, a transmission capacity can be increased according to the number of channels because wavelength division multiplexing (WDM) is applied. Further, the span of the optical fiber transmission line 6 can be increased with a simple configuration because each optical repeater 12 includes the in-line optical amplifier 14.

Figure 2:
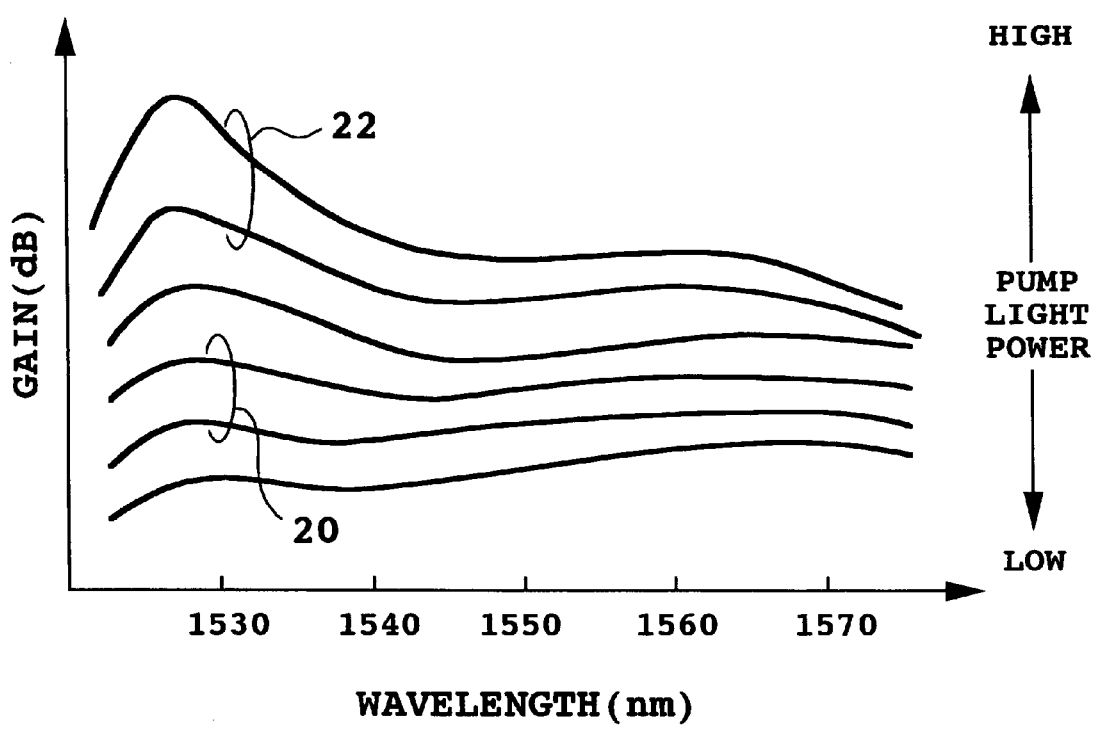
FIG. 2 is a graph showing an example of gain characteristics of an EDFA (erbium doped fiber amplifier)

FIG. 2 is a graph showing an example of gain characteristics of an erbium doped fiber amplifier (EDFA) usable as each optical amplifier 14 shown in FIG. 1. In FIG. 2, the vertical axis represents gain (dB), and the horizontal axis represents wavelength (nm). In an EDFA, the flatness of its gain characteristic is reduced with an increase in pump light power or excitation rate (pumping rate). Reference numeral 20 denotes the gain characteristics in normal operations, showing relatively good flatness. Reference numeral 22 denotes the gain characteristics when the pump light power is increased, showing a difference in optical output level between at a wavelength near 1530 nm and at a wavelength falling within a band of 1540 to 1560 nm, thus producing a gain deviation. Accordingly, in the case of amplifying WDM signal light by an EDFA, maintaining the gain characteristics as shown by reference numeral 20 with good flatness is effective in reducing the influence due to accumulation of level differences.

Figure 3A:
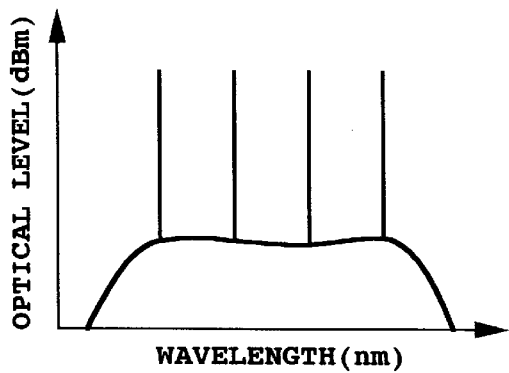
FIGS. 3A to 3D are graphs showing a change in spectrum due to an increase in number of channels in ALC (automatic output level control)
Figure 3B:
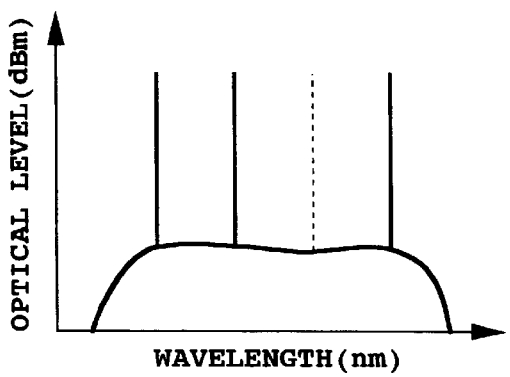
Figure 3C:
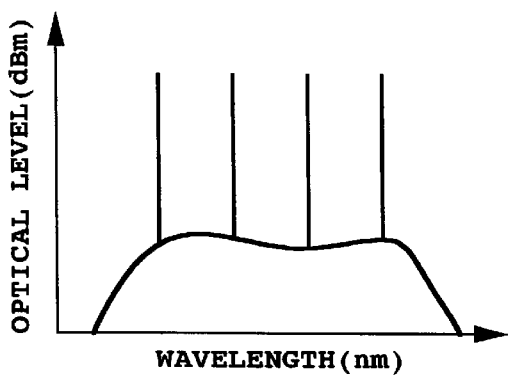
Figure 3D:
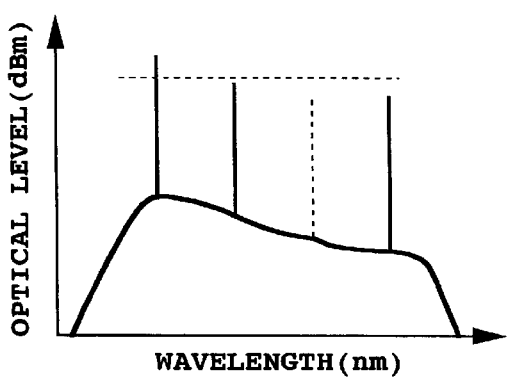

FIGS. 3A to 3D are graphs showing a change in spectrum due to a decrease in number of channels in the case of performing automatic output level control (ALC) only in an EDFA. For example, ALC can be carried out by detecting an optical output level of the EDFA and controlling pump light power so that a detected value of the optical output level becomes constant. When four channels of WDM signal light having a constant input level is input to the EDFA as shown in FIG. 3A and one channel of optical signal is cut off to result in a decrease in number of channels as shown in FIG. 3B, an output spectrum corresponding to the input spectrum as shown in FIG. 3C changes as shown in FIG. 3D. That is, when the number of channels decreases, the power of pump light is increased so that the total output level is maintained constant by ALC, so that the gain characteristic is changed. As a result, the output levels in individual channels become different, and the flatness of the gain characteristic is also not maintained.

Figure 4A:
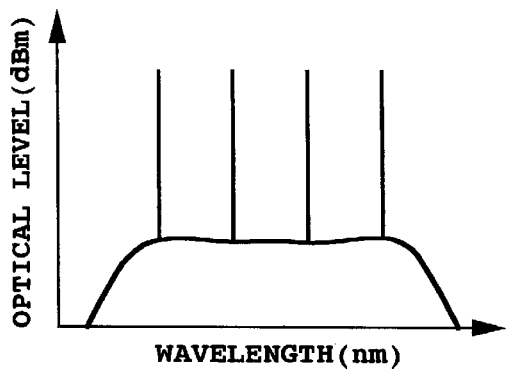
FIGS. 4A to 4D are graphs showing a change in spectrum due to a decrease in optical input level in ALC.
Figure 4B:
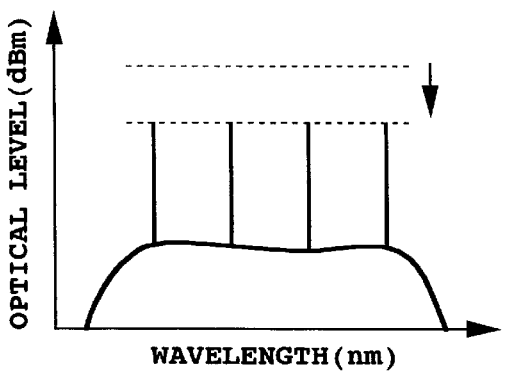
Figure 4C:
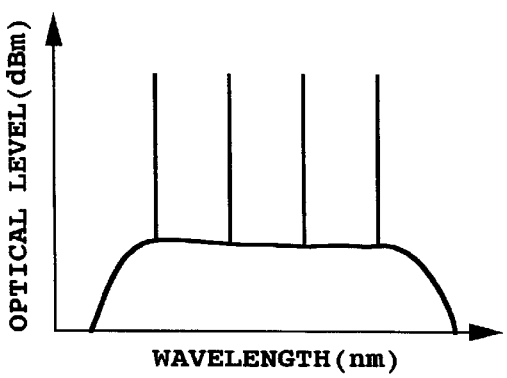
Figure 4D:
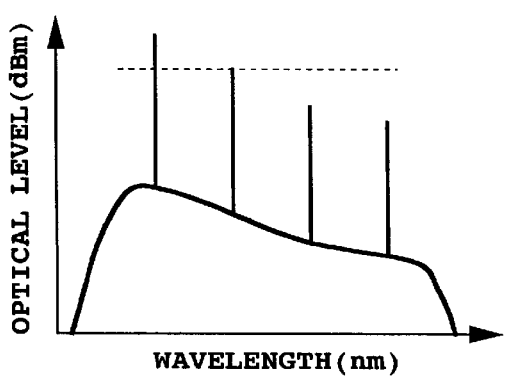

FIGS. 4A to 4D are graphs showing a change in spectrum due to a decrease in optical input level in the case of performing ALC only in an EDFA. When four channels of WDM signal light having a constant input level is input to the EDFA as shown in FIG. 4A and the input level is generally decreased as shown in FIG. 4B, an output spectrum corresponding to the input spectrum as shown in FIG. 4C changes as shown in FIG. 4D. That is, when the input level is generally decreased, the power of pump light is increased so that the total output level is maintained constant by ALC, so that the gain characteristic is changed. As a result, the output levels in individual channels become different, and the flatness of the gain characteristic is not also maintained.

The flatness of the gain characteristic in an EDFA can be maintained by automatic gain control (AGC), for example. By AGC, the power of pump light is controlled so that a ratio or difference between input level and output level of an EDFA becomes constant.

Figure 5A:
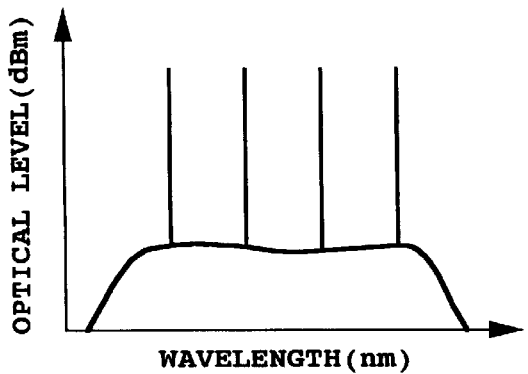
FIGS. 5A to 5D are graphs showing a change in spectrum due to an increase in number of channels in AGC (automatic gain control)
Figure 5B:
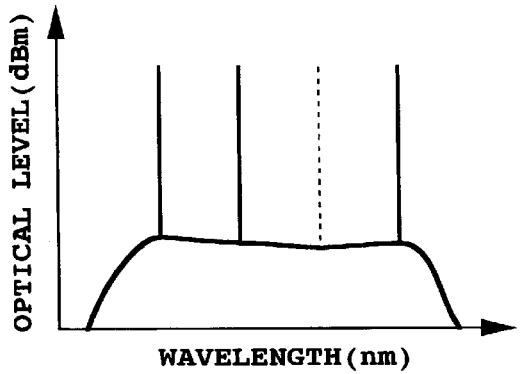
Figure 5C:
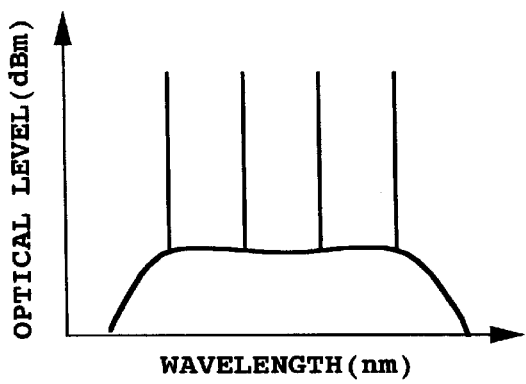
Figure 5D:
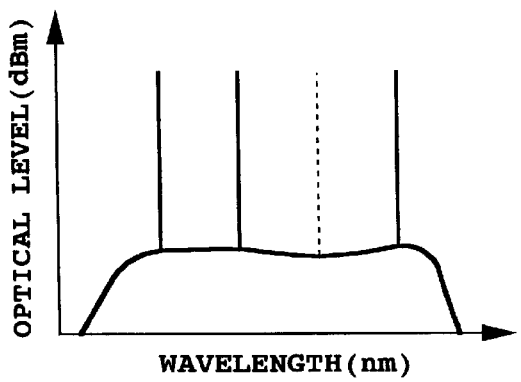

FIGS. 5A to 5D are graphs showing a change in spectrum due to a decrease in number of channels in the case of performing AGC in an EDFA. When four channels of WDM signal light having a constant input level are input to the EDFA as shown in FIG. 5A and one channel of optical signal is cut off to result in a decrease in number of channels as shown in FIG. 5B, an output spectrum corresponding to the input spectrum as shown in FIG. 5C changes as shown in FIG. 5D. That is, although the spectrum of the cut-off channel of optical signal disappears, the other channels do not almost change. In this manner, even when the number of channels changes, an optical output level per channel can be maintained constant, and the flatness of the gain characteristic is also maintained by AGC.

Figure 6A:
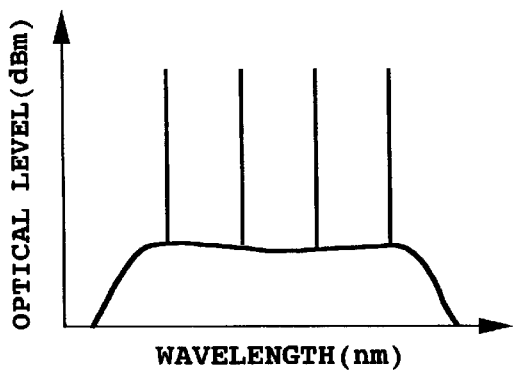
FIGS. 6A to 6D are graphs showing a change in spectrum due to a decrease in optical input level in AGC.
Figure 6B:
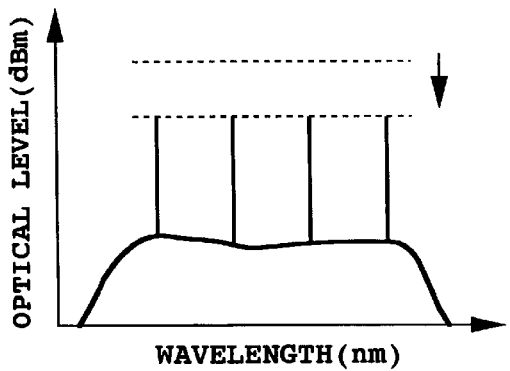
Figure 6C:
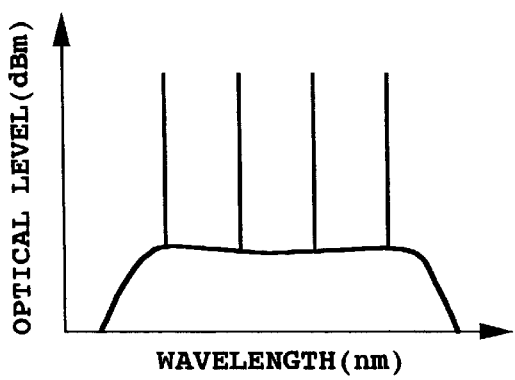
Figure 6D:
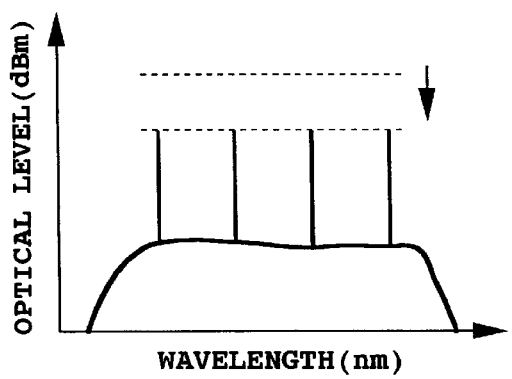

FIGS. 6A to 6D are graphs showing a change in spectrum due to a decrease in optical input level in the case of performing AGC in an EDFA. When four channels of WDM signal light having a constant input level are input to the EDFA as shown in FIG. 6A and the input level is generally decreased as shown in FIG. 6B, an output spectrum corresponding to the input spectrum as shown in FIG. 6C changes as shown in FIG. 6D. In this manner, the flatness of the gain characteristic is substantially maintained because a pumping condition does not almost change in a tolerable range in the case that the input level is generally changed. However, the optical output level generally changes by a change in the input level. As a result, in the in-line amplifier system as shown in FIG. 1, variations in transmission line loss directly appear as variations in output level. If such variations in output level are accumulated, transmission characteristics in a certain channel having a high output level, for example, are degraded by the influence of nonlinear effects as mentioned above.

Some preferred embodiments of the optical amplifier according to the present invention usable as each optical amplifier 14 shown in FIG. 1 will now be described.

Figure 7:
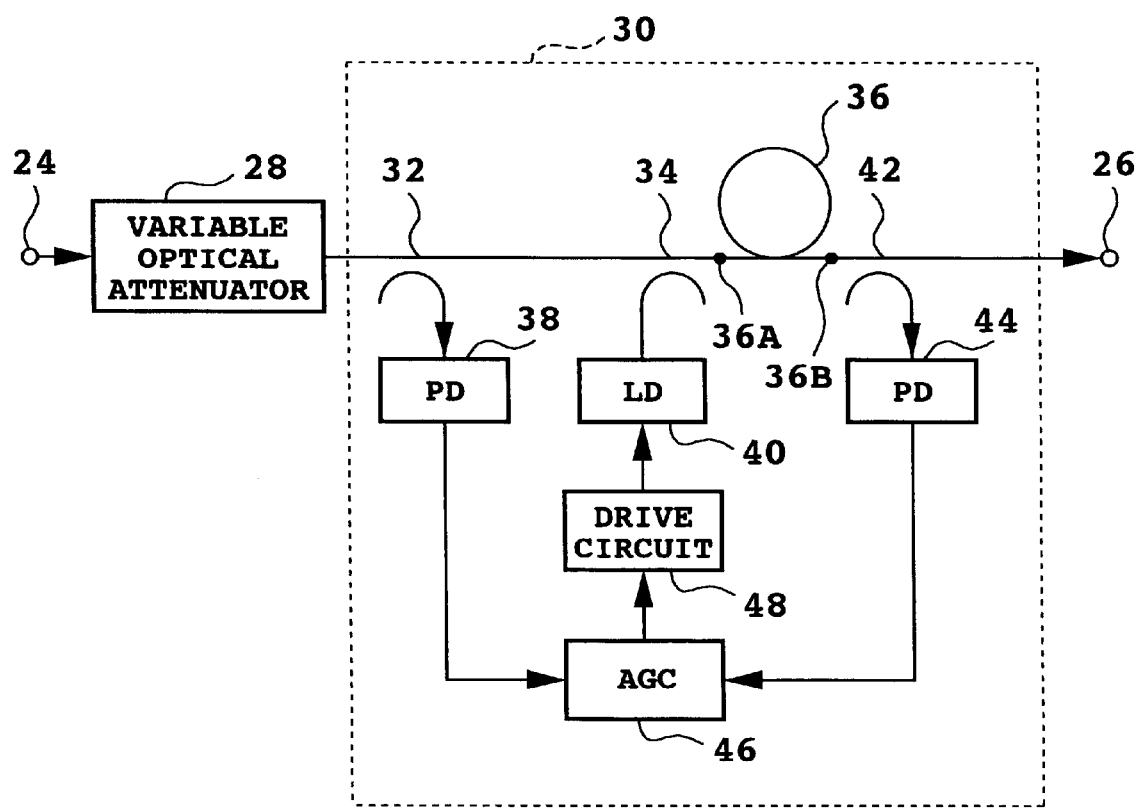
FIG. 7 is a block diagram showing a first preferred embodiment of the optical amplifier according to the present invention.

FIG. 7 is a block diagram showing a first preferred embodiment of the optical amplifier according to the present invention. A variable optical attenuator 28 and an optical amplifying unit 30 are provided in this order in terms of a propagation direction of WDM signal light between an input port 24 and an output port 26. The variable optical attenuator 28 gives a variable attenuation to the WDM signal light supplied to the input port 24 and supplies the attenuated WDM signal light to the optical amplifying unit 30. The WDM signal light supplied to the optical amplifying unit 30 is supplied through an optical coupler 32 and a WDM coupler 34 in this order to an erbium doped fiber (EDF) 36 from its first end 36A. A part of the WDM signal light is extracted by the optical coupler 32 to monitor an input level. The extracted light from the optical coupler 32 is converted into an electrical signal by a photodetector (PD) 38 such as a photodiode. Pump light output from a laser diode (LD) 40 as a pumping source is supplied through the WDM coupler 34 to the EDF 36 from its first end 36A.

In the case that the WDM signal light to be amplified by the use of the EDF 36 has a wavelength band of 1.55 $\mu$m(e.g., 1.50 $\mu$m to 1.60 $\mu$m), the pump light suitably has a wavelength band of 0.9 $\mu$m (e.g., 0.97 $\mu$m to 0.99 $\mu$m) or a wavelength band of 1.48 $\mu$m (e.g., 1.47 $\mu$m to 1.49 $\mu$m).

When the pump light and the WDM signal light are supplied to the EDF 36, the WDM signal light is amplified in accordance with the principle of stimulated emission, and the amplified WDM signal light is output from a second end 36B of the EDF 36. The amplified WDM signal light output from the second end 36B of the EDF 36 is passed through an optical coupler 42 and output from the output port 26. A part of the amplified WDM signal light is extracted by the optical coupler 42 to monitor an output level. The extracted light from the optical coupler 42 is converted into an electrical signal by a photodetector 44. The electrical signals output from the photodetectors 38 and 44 are supplied to an AGC (automatic gain control) circuit 46. The AGC circuit 46 controls a drive current to be supplied from a drive circuit 48 to the laser diode 40 according to the input level and the output level of the EDF 36 (or the optical amplifying unit 30), thereby controlling the power of the pump light so that the gain or gain characteristic of the EDF 36 is maintained constant.

Thus, the optical amplifier according to the present invention is characterized in that the optical amplifying unit performing AGC and the variable optical attenuator providing a variable attenuation are combined.

The accumulation of errors in output level in the case of performing AGC only in a prior art in-line amplifier system as shown in FIG. 8A will now be described with reference to the level diagram shown in FIG. 8B. As shown in FIG. 8A, the in-line amplifier system includes an E/O converter (optical transmitter), postamplifier having a gain $G_0$, optical fiber transmission line having a loss $L_0$, first in-line amplifier having a gain $G_1$, optical fiber transmission line having a loss $L_1$, second in-line amplifier having a gain $G_2$, optical fiber transmission line having a loss $L_2$, third in-line amplifier having a gain $G_3$, optical fiber transmission line having a loss $L_3$, preamplifier having a gain $G_4$, and O/E converter (optical receiver) provided in this order in terms of a transmission direction. In the level diagram shown in FIG. 8B, $P_{out}$ represents a target value of the output level of each amplifier, and $P_{in}$ represents a target value of the input level of each amplifier. Since the gains $G_1$, $G_2$, and $G_3$ of the in-line amplifiers are generally set equal to each other at a fixed value, variations in the loss between the optical fiber transmission lines become errors in the output level, and there is a possibility that the errors may be accumulated to result in an excess output level highly beyond the target value in a certain channel or all channels as shown by reference numeral 50.

The advantage obtained by the use of the optical amplifier according to the present invention over the configuration shown in FIGS. 8A and 8B will now be described with reference to FIGS. 9A and 9B. As shown in FIG. 9A, each in-line amplifier is provided by the optical amplifier according to the present invention. More specifically, the variable optical attenuators incorporated in the first, second, and third in-line amplifiers provide losses $L_{a1}$, $L_{a2}$, and $L_{a3}$, respectively. The losses $L_{a1}$, $L_{a2}$, and $L_{a3}$ provided by the variable optical attenuators incorporated in the in-line amplifiers are set so as to eliminate variations (differences) in loss among the optical fiber transmission lines in the in-line amplifier system. With this configuration, the accumulation of errors in output level can be prevented, and a total optical output level or an optical output level per channel in each in-line amplifier can be maintained constant as shown in FIG. 9B.

Thus, according to the first preferred embodiment of the optical amplifier shown in FIG. 7, the optical output level in each channel of the WDM signal light can be maintained constant by the use of the variable optical attenuator 28. Furthermore, the gain characteristic can be maintained constant by AGC performed in the optical amplifying unit 30.

In particular, by setting a target value of controlled power of the pump light to be output from the laser diode 40 so that the wavelength characteristic of gain becomes flat, a gain deviation between channels can be eliminated, thereby allowing improvement in transmission characteristics in each channel.

In the first preferred embodiment shown in FIG. 7, the variable optical attenuator 28 is provided upstream of the optical amplifying unit 30, so that the attenuation of the variable optical attenuator 28 can be adjusted irrespective of the operational condition of the optical amplifying unit 30. Accordingly, the first preferred embodiment has an advantage such that automatic control of gain as will be hereinafter described can be easily performed. Further, the first preferred embodiment has another advantage such that a burden on pump light power to obtain a given optical output level can be reduced, because the amplified WDM signal light is not substantially attenuated downstream of the optical amplifying unit 30.

Figure 10:
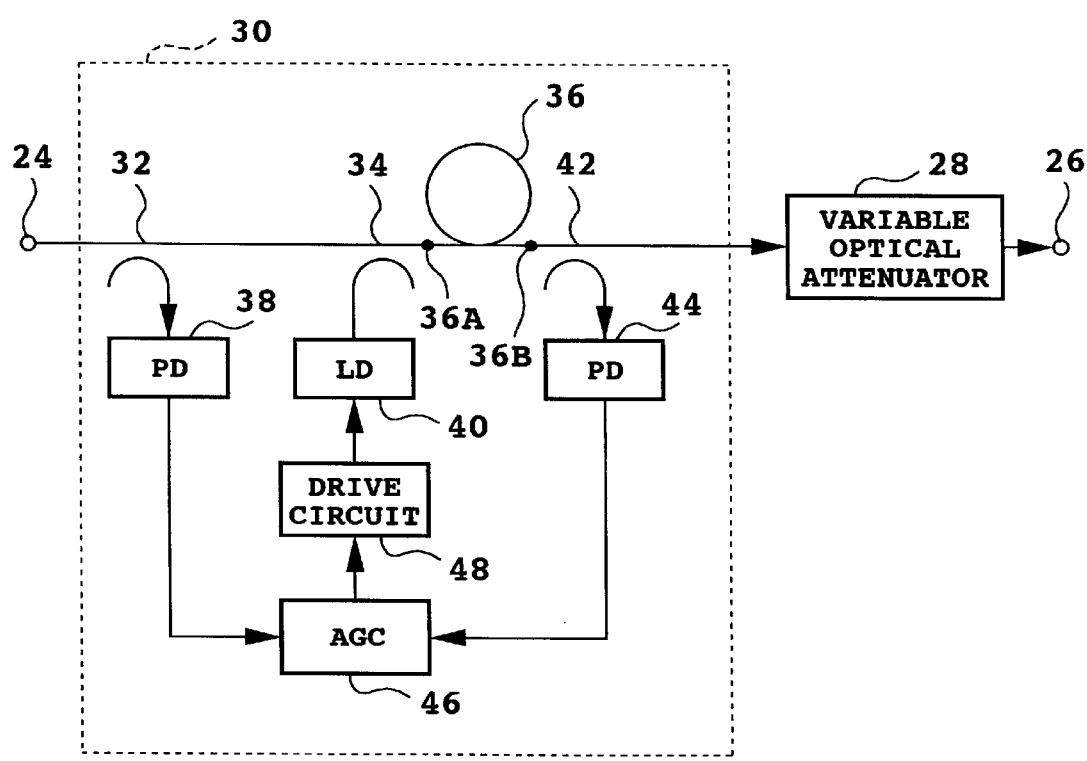
FIG. 10 is a block diagram showing a second preferred embodiment of the optical amplifier according to the present invention.

FIG. 10 is a block diagram showing a second preferred embodiment of the optical amplifier according to the present invention. In contrast with the first preferred embodiment shown in FIG. 7, the second preferred embodiment differs therefrom in that the variable optical attenuator 28 and the optical amplifying unit 30 are connected in reverse order. That is, WDM signal light supplied to the input port 24 is first amplified under AGC in the optical amplifying unit 30, and the amplified WDM signal light is next attenuated by the variable optical attenuator 28 to be output from the output port 26. Also in this preferred embodiment, the optical amplifying unit 30 and the variable optical attenuator 28 are combined, so that the optical output level in each channel of the WDM signal light can be maintained constant, and the gain characteristic can be maintained constant. In particular, according to this preferred embodiment, substantially no loss is applied to the WDM signal light on the upstream side of the optical amplifying unit 30, so that a degradation in SNR (signal-to-noise ratio) as a whole is small.

Figure 11:
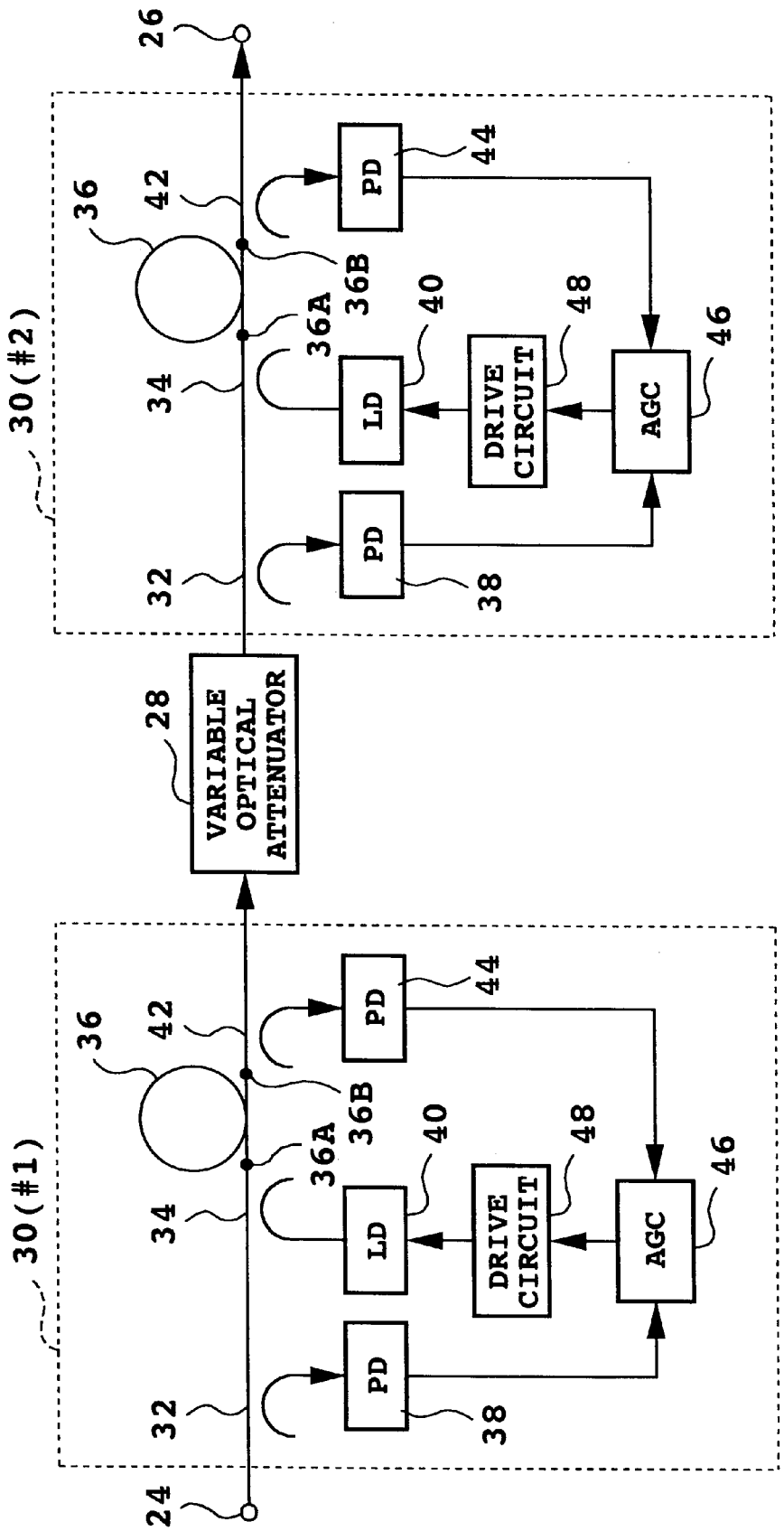
FIG. 11 is a block diagram showing a third preferred embodiment of the optical amplifier according to the present invention.

FIG. 11 is a block diagram showing a third preferred embodiment of the optical amplifier according to the present invention. A first optical amplifying unit 30 (#1), a variable optical attenuator 28, and a second optical amplifying unit 30 (#2) are provided in this order in terms of a propagation direction of WDM signal light between an input port 24 and an output port 26. Each of the optical amplifying units 30 (#1 and #2) has a configuration similar to that of the optical amplifying unit 30 in the first preferred embodiment shown in FIG. 7. That is, AGC is performed in each of the optical amplifying units 30 (#1 and #2).

Also by the combination of the two optical amplifying units 30 (#1 and #2) each performing AGC and the variable optical attenuator 28, the optical output level in each channel of the WDM signal light can be maintained constant, and the gain characteristic can be maintained constant.

The third preferred embodiment shown in FIG. 11 is slightly more complex than the first preferred embodiment shown in FIG. 7 or the second preferred embodiment shown in FIG. 10, because the two optical amplifying units 30 (#1 and #2) are necessary. However, the third preferred embodiment has an advantage such that a degradation in SNR due to an increase in insertion loss of the attenuator 28 is small and a burden on each pump light power is also small.

In each of the first to third preferred embodiments of the optical amplifier, the attenuation to be given to the WDM signal light by the variable optical attenuator 28 may be manually adjusted to achieve one or more of the objects of the present invention. In contrast therewith, some preferred embodiments for allowing automatic control of the attenuation will now be described.

FIG. 12 is a block diagram showing a fourth preferred embodiment of the optical amplifier according to the present invention. In contrast with the first preferred embodiment shown in FIG. 7, the fourth preferred embodiment is characterized in that a feedback loop for controlling the attenuation of the variable optical attenuator 28 is additionally provided to maintain constant the input level or the output level in each channel of the WDM signal light in the optical amplifying unit 30. More specifically, the feedback loop includes a monitor circuit 52 for detecting at least one of the input level and the output level of the optical amplifying unit 30 (or the EDF 36) and the number of channels of the WDM signal light as internal information in the optical amplifying unit 30, and a control circuit 54 for controlling the attenuation of the variable optical attenuator 28 according to detected values output from the monitor circuit 52. The detection of at least one of the input level and the output level may be made according to at least one of the output signals from the photodetectors 38 and 44 shown in FIG. 7.

According to the fourth preferred embodiment shown in FIG. 12, the attenuation of the variable optical attenuator 28 is controlled by the feedback loop. Accordingly, by presetting a target value of the output level in each channel of the WDM signal light, the output level in each channel can be automatically made to coincide with the target value.

FIG. 13 is a block diagram showing a fifth preferred embodiment of the optical amplifier according to the present invention. In this preferred embodiment, the first terminal station 2 shown in FIG. 1 includes means for outputting a supervisory signal including data on the number of channels of the WDM signal light. For example, one of the optical transmitters 8 (#1 to #N) outputs an optical signal as the supervisory signal. In contrast with the fourth preferred embodiment shown in FIG. 12 wherein the number of channels of the WDM signal light is internally detected, the fifth preferred embodiment shown in FIG. 13 is characterized in that the number of channels is detected according to the supervisory signal. To this end, a supervising circuit 56 for receiving the supervisory signal is adopted.

An optical coupler 58 is provided between the input port 24 and the variable optical attenuator 28 to extract a part of the WDM signal light. The extracted light from the optical coupler 58 is passed through an optical bandpass filter 60 and converted into an electrical signal by a photodetector 62. The filter 60 passes an optical signal for the supervisory signal. The electrical signal from the photodetector 62 is supplied to the supervising circuit 56. The supervising circuit 56 detects the number of channels of the WDM signal light according to the supervisory signal received, and supplies a detected value of the number of channels to a control circuit 54' for the variable optical attenuator 28. Further, the supervising circuit 56 updates the supervisory signal received and supplies an resultant updated supervisory signal to a laser diode 57. The updated supervisory signal is converted into an optical signal by the laser diode 57. This optical signal is added to the WDM signal by an optical coupler 59 provided between the optical amplifying unit 30 and the output port 26. One of the optical input level and the optical output level of the optical amplifying unit 30 (or the EDF 36) is detected as internal information in the optical amplifying unit 30 by a monitor circuit 55, and a detected value output from the monitor circuit 55 is supplied to the control circuit 54'. The control circuit 54' controls the attenuation of the variable optical attenuator 28 according to the detected value supplied.

Also according to this preferred embodiment, the output level in each channel of the WDM signal light can be automatically controlled to become constant like the fourth preferred embodiment shown in FIG. 12.

While the fourth preferred embodiment and the fifth preferred embodiment have been described in contrast with the first preferred embodiment shown in FIG. 7, each of the fourth preferred embodiment and the fifth preferred embodiment may be combined with the second preferred embodiment or the third preferred embodiment to perform the automatic control.

Figure 14:
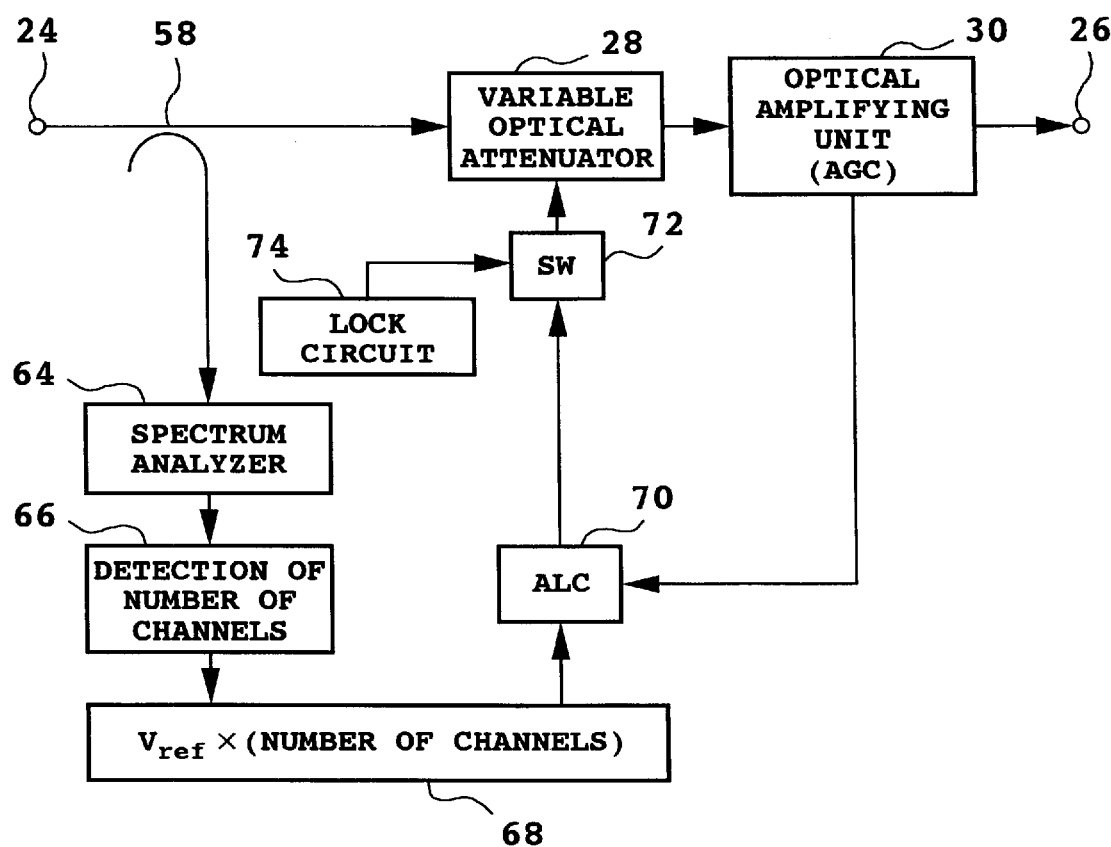
FIG. 14 is a block diagram showing a sixth preferred embodiment of the optical amplifier according to the present invention.

FIG. 14 is a block diagram showing a sixth preferred embodiment of the optical amplifier according to the present invention. In this preferred embodiment, ALC (automatic output level control) is performed according to the total optical input level or the total optical output level of the optical amplifying unit 30. This will now be described more specifically.

A part of the WDM signal light is extracted by an optical coupler 58, and next supplied to a spectrum analyzer 64. A monitor circuit 66 detects the number of channels of the WDM signal light according to an output signal from the spectrum analyzer 64. A detected value of the number of channels from the monitor circuit 66 is supplied to a computing circuit 68. The computing circuit 68 multiplies a reference voltage $V_{ref}$ per channel in ALC by the number of channels detected above to obtain a voltage value, and supplies the voltage value to an ALC circuit 70. The ALC circuit 70 controls the attenuation of the variable optical attenuator 28 so that a voltage level proportional to the total optical input level or the total optical output level provided as the internal information in the optical amplifying unit 30 becomes the voltage value obtained by the computing circuit 68. The total optical input level and the total optical output level in the optical amplifying unit 30 may be obtained according to the output signals from the photodetectors 38 and 44 shown in FIG. 7.

In particular, this preferred embodiment employs a switch 72 and a lock circuit 74 to operate the feedback loop for ALC at starting the optical amplifier and stop the operation of the feedback loop in other operational conditions of the optical amplifier. More specifically, at initial starting (cold starting) of the optical amplifier or at restarting of the optical amplifier in relation to recovery from power down, recovery from break of optical input in all the channels, or change of a transmission line route, the switch 72 operates the ALC circuit 70 to control the attenuation of the variable optical attenuator 28. In other operational conditions of the optical amplifier, the switch 72 changes from the ALC circuit 70 to the lock circuit 74 to lock a target value of the attenuation of the variable optical attenuator 28 in a previous cycle of ALC. The reason for such locking is that there is no possibility of fluctuations in transmission line loss during normal operation of the system, so attenuation control need not always be carried out during the normal operation.

Figure 15:
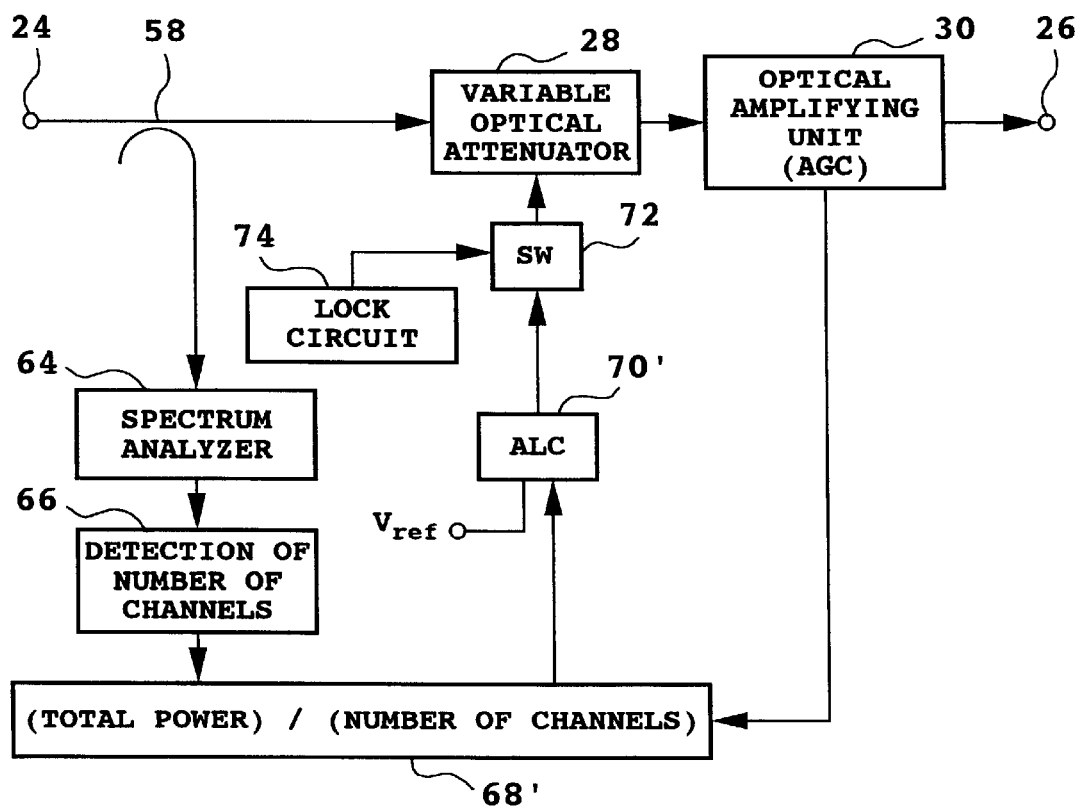
FIG. 15 is a block diagram showing a seventh preferred embodiment of the optical amplifier according to the present invention.

FIG. 15 is a block diagram showing a seventh preferred embodiment of the optical amplifier according to the present invention. In this preferred embodiment, the detected value of the number of channels of the WDM signal light from the monitor circuit 66 and the voltage value proportional to the total optical input level or the total optical output level in the optical amplifying unit 30 are supplied to a computing circuit 68'. The computing circuit 68' divides the supplied voltage value by the detected value of the number of channels to obtain an average voltage value, and supplies the average voltage value to an ALC circuit 70'. The ALC circuit 70' controls the attenuation of the variable optical attenuator 28 so that the supplied average voltage value becomes equal to a reference voltage value $V_{ref}$ per channel. The reference voltage value $V_{ref}$ may be set as a fixed value at starting the system.

Also according to this preferred embodiment, the optical output level in each channel of the WDM signal light can be maintained constant like the sixth preferred embodiment shown in FIG. 14.

While both the WDM signal light to be amplified and the pump light propagate in the same direction in the EDF 36 to effect forward pumping in each of the above preferred embodiments, the propagation directions of the WDM signal light and the pump light in the EDF 36 may be made opposite to each other by providing the WDM coupler 34 shown in FIG. 7 downstream of the EDF 36 in terms of the propagation direction of the WDM signal light, thereby effecting backward pumping. Alternatively, bidirectional pumping may be effected by using two pumping sources.

While the EDF 36 is used as an optical amplifying medium in each of the above preferred embodiments, a doped fiber doped with any one or more of the other rare earth elements such as Nd and Yb may be used as the optical amplifying medium.

Further, two or more of all the preferred embodiments mentioned above may be combined to carry out the present invention.

In addition, application of the optical amplifier according to the present invention is not limited to the system as shown in FIG. 1. For example, the optical amplifier according to the present invention is applicable also to a network system including three or more terminal stations connected through optical fibers by use of an optical add/drop circuit.

As described above, according to the present invention, it is possible to provide an optical amplifier and a system including the optical amplifier which can maintain constant the optical output level in each channel of WDM signal light and can maintain the gain characteristic constant.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical amplifier comprising:
   an optical amplifying medium to which WDM (wavelength division multiplexed) signal light obtained by wavelength division multiplexing a plurality of optical signals having different wavelengths is supplied;
   a pumping unit to pump said optical amplifying medium so that said optical amplifying medium gives a gain to said WDM signal light;
   a controlling unit to control said pumping unit according to an input level and an output level of said optical amplifying medium so that said gain is maintained constant;
   a first detector to detect said output level of said optical amplifying medium;
   a second detector to detect the number of said plurality of optical signals;
   an optical attenuator operatively connected to said optical amplifying medium for giving a variable attenuation to said WDM signal light; and
   a feedback loop for controlling the attenuation of said optical attenuator to set the output of level of said optical amplifying medium in accordance with the number of said plurality of optical signals so as to maintain constant the level of each of said plurality of optical signals.

2. An optical amplifier according to claim 1, wherein:

said optical amplifying medium has a first end and a second end;

said WDM signal light is supplied to said first end; and said optical attenuator has an output port operatively connected to said first end.

3. An optical amplifier according to claim 1, wherein:

said optical amplifying medium has a first end and a second end;

said WDM signal light is supplied to said first end; and said optical attenuator has an input port operatively connected to said second end.

4. An optical amplifier according to claim 3, further comprising an optical amplifying unit operatively connected to an output port of said optical attenuator, said optical amplifying unit having a constant gain.

5. An optical amplifier according to claim 1, further comprising a device to operate said feedback loop when starting said optical amplifier and stop operation of said feedback loop in other operational conditions of said optical amplifier.

6. A optical amplifier according to claim 1, wherein:

said optical amplifying medium comprises a doped fiber doped with a rare earth element, said doped fiber having a first end and a second end;

said pumping unit includes a pumping source for supplying pump light to said doped fiber from at least one of said first end and said second end; and said controlling unit controls the power of said pump light.

7. An optical amplifier according to claim 6, wherein a target value of the power of said pump light is set so that a wavelength characteristic of said gain becomes flat.

8. An optical communication system comprising:

an optical fiber transmission line for propagating WDM (wavelength division multiplexed) signal light obtained by wavelength division multiplexing a plurality of optical signals having different wavelengths; and at least one optical amplifier provided in said optical fiber transmission line, said optical amplifier comprising:

an optical amplifying medium to which said WDM signal light is supplied;

a pumping unit to pump said optical amplifying medium so that said optical amplifying medium gives a gain to said WDM signal light;

a controlling unit to control said pumping unit according to an input level and an output level of said optical amplifying medium so that said gain is maintained constant; and a first detector to detect said output level of said optical amplifying medium;

a second detector to detect the number of said plurality of optical signals;

an optical attenuator operatively connected to said optical amplifying medium for giving a variable optical attenuation to said WDM signal light; and a feedback loop for controlling the attenuation of said optical attenuator to set the output of level of said optical amplifying medium in accordance with the number of said plurality of optical signals so as to maintain constant the level of each of said plurality of optical signals.

9. An optical communication system according to claim 8, further comprising:

a first terminal station apparatus supplying said WDM signal light to said optical fiber transmission line at one end of said optical fiber transmission line; and a second terminal station apparatus for receiving said WDM signal light from said optical fiber transmission line at the other end of said optical fiber transmission line.

10. An optical communication system according to claim 9, wherein:

said first terminal station apparatus includes a transmitter to output a supervisory signal including data on the number of said plurality of optical signals; and said optical amplifier further comprises a receiver to receive said supervisory signal.

11. An optical communication system according to claim 8, wherein:

said optical amplifying medium has a first end and a second end;

said WDM signal light is supplied to said first end; and said optical attenuator has an output port operatively connected to said first end.

12. An optical communication system according to claim 8, wherein:

said optical amplifying medium has a first end and a second end;

said WDM signal light is supplied to said first end; and said optical attenuator has an input port operatively connected to said second end.

13. An optical communication system according to claim 12, wherein said optical amplifier further comprises an optical amplifying unit operatively connected to an output port of said optical attenuator, said optical amplifying unit having a constant gain.

14. An optical communication system according to claim 8, wherein said optical amplifier further comprises a device to operate said feedback loop when starting said optical amplifier and stop operation of said feedback loop in other operational conditions of said optical amplifier.

15. An optical communication system according to claim 8, wherein:

said optical amplifying medium comprises a doped fiber doped with a rare earth element, said doped fiber having a first end and a second end;

said pumping unit includes a pumping source for supplying pump light to said doped fiber from at least one of said first end and said second end; and said controlling unit controls the power of said pump light.

16. An optical communication system according to claim 15, wherein a target value of the power of said pump light is set so that a wavelength characteristic of said gain becomes flat.

17. An optical communication system according to claim 10, further comprising a supervising circuit to update the supervisory signal and transmit the updated supervisory signal toward the second terminal station.

18. An optical amplifier comprising:

an optical amplifying medium to which WDM (wavelength division multiplexed) signal light obtained by wavelength division multiplexing a plurality of optical signals having different wavelengths is supplied;

means for pumping said optical amplifying medium so that said optical amplifying medium gives a gain to said WDM signal light;

means for controlling said pumping means according to an input level and an output level of said optical amplifying medium so that said gain is maintained constant;

a first detector to detect said output level of said optical amplifying medium;

a second detector to detect the number of said plurality of optical signals;

an optical attenuator operatively connected to said optical amplifying medium for giving a variable attenuation to said WDM signal light; and a feedback loop for controlling the attenuation of said optical attenuator to set the output of level of said optical amplifying medium in accordance with the number of said plurality of optical signals so as to maintain constant the level of each of said plurality of optical signals.

* * * * *